US010052614B2

(12) United States Patent
Miller et al.

(10) Patent No.: US 10,052,614 B2
(45) Date of Patent: Aug. 21, 2018

(54) MIXED METAL OXIDES

(71) Applicant: UOP LLC, Des Plaines, IL (US)

(72) Inventors: Stuart Miller, Arlington Heights, IL (US); Susan C. Koster, Carpentersville, IL (US)

(73) Assignee: UOP LLC, Des Plaines, IL (US)

( * ) Notice: Subject to any disclaimer, the term of this patent is extended or adjusted under 35 U.S.C. 154(b) by 0 days.

(21) Appl. No.: 15/377,753

(22) Filed: Dec. 13, 2016

(65) Prior Publication Data

US 2017/0165644 A1      Jun. 15, 2017

Related U.S. Application Data

(60) Provisional application No. 62/267,874, filed on Dec. 15, 2015.

(51) Int. Cl.

| | |
|---|---|
| *B01J 21/10* | (2006.01) |
| *B01J 23/16* | (2006.01) |
| *B01J 23/72* | (2006.01) |
| *B01J 23/74* | (2006.01) |
| *B01J 23/76* | (2006.01) |
| *B01J 37/04* | (2006.01) |
| *B01J 37/08* | (2006.01) |
| *B01J 37/20* | (2006.01) |
| *C10G 45/08* | (2006.01) |
| *C10G 45/50* | (2006.01) |
| *C10G 47/04* | (2006.01) |
| *B01J 23/883* | (2006.01) |
| *B01J 23/00* | (2006.01) |
| *B01J 21/08* | (2006.01) |
| *B01J 21/04* | (2006.01) |
| *B01J 21/12* | (2006.01) |
| *B01J 37/00* | (2006.01) |
| *C10G 45/60* | (2006.01) |

(52) U.S. Cl.
CPC ............ *B01J 23/883* (2013.01); *B01J 21/04* (2013.01); *B01J 21/08* (2013.01); *B01J 21/12* (2013.01); *B01J 23/002* (2013.01); *B01J 37/009* (2013.01); *B01J 37/0009* (2013.01); *B01J 37/04* (2013.01); *B01J 37/088* (2013.01); *B01J 37/20* (2013.01); *C10G 45/08* (2013.01); *C10G 45/50* (2013.01); *C10G 45/60* (2013.01); *C10G 47/04* (2013.01); *C10G 2300/202* (2013.01); *C10G 2300/205* (2013.01)

(58) Field of Classification Search
CPC ... B01J 21/10; B01J 23/16; B01J 23/72; B01J 23/74; B01J 23/76; B01J 37/0009; B01J 37/009; B01J 37/04; B01J 37/08; B01J 37/20; B01J 45/08; B01J 45/50; B01J 47/04; C10G 45/08; C10G 45/50; C10G 47/04

See application file for complete search history.

(56) References Cited

U.S. PATENT DOCUMENTS

| | | |
|---|---|---|
| 4,820,677 A | 4/1989 | Jacobson et al. |
| 4,904,634 A | 2/1990 | Wieserman et al. |
| 5,278,121 A | 1/1994 | Singhal et al. |
| 6,156,695 A | 12/2000 | Soled et al. |
| 6,162,350 A | 12/2000 | Soled et al. |
| 6,197,273 B1 | 3/2001 | Nagano et al. |
| 6,280,610 B1 | 8/2001 | Uragami et al. |
| 6,299,760 B1 | 10/2001 | Soled et al. |
| 6,534,437 B2 | 3/2003 | Eijsbouts et al. |
| 6,582,590 B1 | 6/2003 | Riley et al. |
| 6,620,313 B1 | 9/2003 | Demmin et al. |
| 6,635,599 B1 | 10/2003 | Eijsbouts et al. |
| 6,652,738 B2 | 11/2003 | Eijsbouts et al. |
| 6,712,955 B1 | 3/2004 | Hou et al. |
| 6,783,663 B1 | 8/2004 | Riley et al. |
| 6,863,803 B1 | 3/2005 | Riley et al. |
| 6,929,738 B1 | 8/2005 | Riley et al. |
| 7,229,548 B2 | 6/2007 | Riley et al. |
| 7,232,515 B1 | 6/2007 | Demmin et al. |
| 7,232,934 B2 | 6/2007 | Saleh et al. |
| 7,288,182 B1 | 10/2007 | Soled et al. |
| 7,513,989 B1 | 4/2009 | Soled et al. |
| 7,538,066 B2 | 5/2009 | Soled et al. |
| 7,544,632 B2 | 6/2009 | Soled et al. |
| 7,591,942 B2 | 9/2009 | Soled et al. |
| 7,605,107 B2 | 10/2009 | Soled et al. |
| 7,608,558 B2 | 10/2009 | Eijsbouts et al. |

(Continued)

FOREIGN PATENT DOCUMENTS

| | | |
|---|---|---|
| CA | 2719157 A1 | 10/2009 |
| CA | 2620656 C | 3/2014 |
| CN | 102049265 A | 5/2011 |
| EP | 2103347 A1 | 9/2009 |
| RU | 2098181 C1 | 12/1997 |
| WO | 0042126 A1 | 7/2000 |
| WO | 2009061295 A1 | 5/2009 |
| WO | 2014033653 A2 | 3/2014 |

OTHER PUBLICATIONS

Amaya, "Unsupported sulfides obtained from high specific area mixed oxides as hydrotreating catalysts", Revista Facultad de Ingenieria, Universidad de Antioquia (2010), 56, 58-67, Language: Spanish, Database: CAPLUS.

An, "Preparation of unsupported and mesoporous Ni—Mo—W sulfide catalysts by low temperature solid-state reaction", Journal of China University of Petroleum (Edition of Natural Science), v 31, n 6, p. 156-160, Dec. 2007, ISSN: 16735005; Publisher: Ed. Off. Journal of the Univ. Petroleum, China. Language: Chinese.

Calderon-Magdaleno, "Effect of the amount of citric acid used in the preparation of NiMo/SBA-15 catalysts on their performance in HDS of dibenzothiophene-type compounds", Catalysis Today, v 220-222, p. 78-88, Mar. 2014; ISSN: 09205861; DOI: 10.1016/j.cattod.2013.06.002; Publisher: Elsevier.

(Continued)

*Primary Examiner* — Randy Boyer

(57) ABSTRACT

A novel mixed metal molybdate useful as a hydroprocessing catalyst has been created. The hydroprocessing using the novel mixed metal molybdate material may include hydrodenitrification, hydrodesulfurization, hydrodemetallation, hydrodesilication, hydrodearomatization, hydroisomerization, hydrotreating, hydrofining, and hydrocracking.

6 Claims, 2 Drawing Sheets

(56) References Cited

U.S. PATENT DOCUMENTS

| | | | |
|---|---|---|---|
| 7,648,941 | B2 | 1/2010 | Soled et al. |
| 7,686,943 | B2 | 3/2010 | Soled et al. |
| 7,691,257 | B2 | 4/2010 | Shih et al. |
| 7,709,412 | B2 | 5/2010 | Shih et al. |
| 7,749,937 | B2 | 7/2010 | Domokos et al. |
| 7,776,205 | B2 | 8/2010 | Soled et al. |
| 7,780,845 | B2 | 8/2010 | Soled et al. |
| 7,951,746 | B2 | 5/2011 | Bai et al. |
| 8,062,508 | B2 | 11/2011 | Soled et al. |
| 8,067,331 | B2 | 11/2011 | Eijsbouts-Spickova et al. |
| 8,080,492 | B2 | 12/2011 | Kuperman et al. |
| 8,173,570 | B2 | 5/2012 | Maesen et al. |
| 8,206,575 | B2 | 6/2012 | Maesen et al. |
| 8,216,958 | B2 | 7/2012 | Wu et al. |
| 8,318,628 | B2 | 11/2012 | Brun et al. |
| 8,343,887 | B2 | 1/2013 | Maesen et al. |
| 8,377,289 | B2 | 2/2013 | Li et al. |
| 8,383,543 | B2 | 2/2013 | Maesen et al. |
| 8,586,500 | B2 | 11/2013 | Kuperman et al. |
| 8,636,967 | B2 | 1/2014 | Canelon et al. |
| 8,846,560 | B2 | 9/2014 | Yang et al. |
| 2004/0235653 | A1* | 11/2004 | Domokos ............. B01J 21/063 502/309 |
| 2008/0280754 | A1 | 11/2008 | Toledo Antonio et al. |
| 2009/0114566 | A1 | 5/2009 | Chen et al. |
| 2012/0065056 | A1 | 3/2012 | Domokos et al. |
| 2012/0122653 | A1 | 5/2012 | Maesen et al. |
| 2012/0122659 | A1 | 5/2012 | Kuperman et al. |
| 2012/0172199 | A1 | 7/2012 | Yang et al. |
| 2013/0068662 | A1 | 3/2013 | Maesen et al. |
| 2013/0337996 | A1 | 12/2013 | Eijsbouts-Spickova et al. |
| 2014/0027350 | A1 | 1/2014 | Soled et al. |
| 2015/0292095 | A1 | 10/2015 | Haber et al. |
| 2017/0165639 | A1* | 6/2017 | Klein ................ B01J 21/04 |
| 2017/0165644 | A1 | 6/2017 | Miller et al. |
| 2017/0165645 | A1 | 6/2017 | Miller et al. |
| 2017/0165649 | A1 | 6/2017 | Miller et al. |
| 2017/0165650 | A1 | 6/2017 | Miller et al. |
| 2017/0165651 | A1 | 6/2017 | Miller et al. |
| 2017/0165652 | A1 | 6/2017 | Miller et al. |
| 2017/0165656 | A1 | 6/2017 | Miller et al. |
| 2017/0166605 | A1 | 6/2017 | Miller et al. |
| 2017/0218528 | A1 | 8/2017 | Zhang et al. |

OTHER PUBLICATIONS

Escobar, "Effect of ethylene glycol addition on the properties of P-doped NiMo/Al2O3 HDS catalysts: Part I. Materials preparation and characterization", Applied Catalysis B: Environmental, v 88, n 3/4, p. 564-575, May 20, 2009; ISSN: 09263373; DOI: 10.1016/j.apcatb.2008.10.005; Publisher: Elsevier.

Gil-Llambias, "Hydrodesulfurization Catalysts Electrophoretic Study of Mo (or W)—Co, Mo (or W)—Ni, and Mo (or W)—Ca Sulfided Phases", J. Catal., v 102, n 1, p. 37-42, Nov. 1986; ISSN: 00219517; Publisher: Academic Press.

Levin, "Crystal Structure of an Ammonium Nickel Molybdate Prepared by Chemical Precipitation", Inorg. Chem. 1996, 35, 4191-4197.

Nava, "Effect of phosphorus addition on unsupported Ni—Mo—W sulfide catalysts prepared by the in situ activation of nickel/tetramethylammonium thiomolybdotungstate", Applied Catalysis A: General, v 303, n 2, p. 177-184, Apr. 28, 2006; ISSN: 0926860X; DOI: 10.1016/j.apcata.2005.12.025; Publisher: Elsevier.

Nikulshin, "Influence of nature of precursors of aluminum nickel molybdenum catalysts on their performance in hydrodesulfurization", Neftekhimiya, v 46, n 5, p. 371-376, 2006; Language: Russian; ISSN: 00282421; Publisher: East View Publications.

Olivas, "Trimetallic NiMoW unsupported catalysts for HDS", ACS Division of Petroleum Chemistry, Inc. Preprints, v 50, n 4, p. 372-374, Aug. 2005; ISSN: 05693799; Publisher: American Chemical Society.

Yin, "A novel porous ammonium nickel molybdate as the catalyst precursor towards deep hydrodesulfurization of gas oil", p. 873-878, 2013, ISSN: 0016-2361, Publisher Elsevier Science.

Yin, "Mechanism of Hydrodesulfurization of dibenzothiophenes on unsupported NiMoW catalyst", Journal of Fuel chemistry and Technology, v 41, n 8, p. 991-997, Aug. 2013; ISSN: 18725813; DOI: 10.1016/S1872-5813(13) 60043-2; Publisher: Science Press.

Zhang, "Solution synthesis of unsupported Ni—W—S hydrotreating catalysts", Catalysis Communications 8 (2007) 2232-2237.

Zhou, "Study on hydrodesulfurization process of diesel on unsupported catalyst", Petroleum Processing and Petrochemicals, v 44, n 10, p. 38-43, Oct. 2013; Language: Chinese; ISSN: 10052399; Publisher: Research Institute of Petroleum Processing, SINOPEC.

Clearfield, "Studies in Heavy-Metal Molybdates. I. Crystal Structure of a Basic Zinc Molybdate, NaZn2OH(H20) (Mo04)21a", Inorganic Chemistry, vol. 15, No. 2, 1976, 335-338.

Clearfield, "Preparation and Structure of Manganese Molybdates", Inorg. Chem. 1985, 24, 4606-4609.

Clearfield, "Studies in Heavy-Metal Molybdates. 2. Crystal Structure of Disodium Di-u-hydroxo-dizin(II) Molybdate", Inorganic Chemistry, vol. 16, No. 3, 1977, 628-631.

Duan, "Ternary Ni—Co—Mo oxy-hydroxide nanoflakes grown on carbon cloth for excellent supercapacitor electrodes", Materials Letters 208 (2017) 65-68.

Hsu, "Synthesis and characterization of mesoporous Ni—Co oxy-hydroxides for pseudocapacitor application", Electrochimica Acta 94 (2013) 104-112.

Lien, "High-performance asymmetric supercapacitor consisting of Ni—Co—Cu oxy-hydroxide nanosheets and activated carbon", Electrochemistry Communications 34 (2013) 323-326.

Xiao, "Remarkable improvement of the turn-on characteristics of a Fe2O3 photoanode for photoelectrochemical water splitting with coating a FeCoW oxy-hydroxide gel", Applied Catalysis B: Environmental 212 (2017) 89-96.

* cited by examiner

MIXED METAL OXIDES

CROSS-REFERENCE TO RELATED APPLICATION

This application claims priority from Provisional Application No. 62/267,874 filed Dec. 15, 2015, the contents of which are hereby incorporated by reference.

FIELD OF THE INVENTION

This invention relates to a new material useful as a hydroprocessing catalyst. More particularly this invention relates to unique mixed metal oxides and their use as hydroprocessing catalysts. The hydroprocessing may include hydrodenitrification, hydrodesulfurization, hydrodesilication, hydrodemetallation, hydrodearomatization, hydroisomerization, hydrotreating, hydrofining, and hydrocracking.

BACKGROUND

In order to meet the growing demand for petroleum products there is greater utilization of sour crudes, which when combined with tighter environmental legislation regarding the concentration of nitrogen and sulfur within fuel, leads to accentuated refining problems. The removal of sulfur (hydrodesulfurization—HDS) and nitrogen (hydrodenitrification—HDN) containing compounds from fuel feed stocks is targeted during the hydrotreating steps of refining and is achieved by the conversion of organic nitrogen and sulfur to ammonia and hydrogen sulfide respectively.

Since the late 1940s the use of catalysts containing nickel (Ni) and molybdenum (Mo) or tungsten (W) have demonstrated up to 80% sulfur removal. See for example, V. N. Ipatieff, G. S. Monroe, R. E. Schaad, Division of Petroleum Chemistry, 115$^{th}$ Meeting ACS, San Francisco, 1949. For several decades now there has been an intense interest directed towards the development of materials to catalyze the deep desulfurization, in order to reduce the sulfur concentration to the ppm level. Some recent breakthroughs have focused on the development and application of more active and stable catalysts targeting the production of feeds for ultra low sulfur fuels. Several studies have demonstrated improved HDS and HDN activities through elimination of the support such as, for example, $Al_2O_3$. Using bulk unsupported materials provides a route to increase the active phase loading in the reactor as well as providing alternative chemistry to target these catalysts.

More recent research in this area has focused on the ultra deep desulfurization properties achieved by a Ni—Mo/W unsupported 'trimetallic' material reported in, for example, U.S. Pat. No. 6,156,695. The controlled synthesis of a broadly amorphous mixed metal oxide consisting of molybdenum, tungsten and nickel, significantly outperformed conventional hydrotreating catalysts. The structural chemistry of the tri-metallic mixed metal oxide material was likened to the hydrotalcite family of materials, referring to literature articles detailing the synthesis and characterization of a layered nickel molybdate material, stating that the partial substitution of molybdenum with tungsten leads to the production of a broadly amorphous phase which, upon decomposition by sulfidation, gives rise to superior hydrotreating activities.

The chemistry of these layered hydrotalcite-like materials was first reported by H. Pezerat, contribution à l'étude des molybdates hydrates de zinc, cobalt et nickel, *C. R. Acad. Sci.*, 261, 5490, who identified a series of phases having ideal formulas $MMoO_4.H_2O$, $EHM_2O^-$ $(MoO_4)_2.H_2O$, and $E_{2-x}(H_3O)_xM_2O(MoO_4)_2$ where E can be $NH_4^+$, $Na^+$ or $K^+$ and M can be $Zn^{2+}$, $Co^{2+}$ or $Ni^{2+}$.

Pezerat assigned the different phases he observed as being and Φc, Φy or Φy and determined the crystal structures for Φx and Φy, however owing to a combination of the small crystallite size, limited crystallographic capabilities and complex nature of the material, there were doubts raised as to the quality of the structural assessment of the materials. During the mid 1970s, Clearfield et al attempted a more detailed analysis of the Φx and Φy phases, see examples A. Clearfield, M. J. Sims, R. Gopal, *Inorg. Chem.*, 15, 335; A. Clearfield, R. Gopal, C. H. Saldarriaga-Molina, *Inorg. Chem.*, 16, 628. Single crystal studies on the product from a hydrothermal approach allowed confirmation of the Φx structure, however they failed in their attempts to synthesize Φy and instead synthesized an alternative phase, Na—Cu(OH)(MoO_4), see A. Clearfield, A. Moini, P. R. Rudolf, *Inorg. Chem.*, 24, 4606.

The structure of Φy was not confirmed until 1996 when by Ying et al. Their investigation into a room temperature chimie douce synthesis technique in the pursuit of a layered ammonium zinc molybdate led to a metastable aluminum-substituted zincite phase, prepared by the calcination of Zn/Al layered double hydroxide $(Zn_4Al_2(OH)_{12}CO_3.zH_2O)$. See example D. Levin, S. L. Soled, J. Y. Ying, *Inorg. Chem.*, 1996, 35, 4191-4197. This material was reacted with a solution of ammonium heptamolybdate at room temperature to produce a highly crystalline compound, the structure of which could not be determined through conventional ab-initio methods. The material was indexed, yielding crystallographic parameters which were the same as that of an ammonium nickel molybdate, reported by Astier, see example M. P. Astier, G. Dji, S. Teichner, J. *Ann. Chim.* (Paris), 1987, 12, 337, a material belonging to a family of ammonium-amine-nickel-molybdenum oxides closely related to Pezerat's materials. Astier did not publish any detailed structural data on this family of materials, leading to Ying et al reproducing the material to be analyzed by high resolution powder diffraction in order to elucidate the structure. Ying et al named this class of materials 'layered transition-metal molybdates' or LTMs.

SUMMARY OF THE INVENTION

A unique mixed metal oxide material has been produced and optionally sulfided, to yield an active hydroprocessing catalyst. The mixed metal oxide material has the formula:

$MMo_xO_y$ 

where 'M' is a metal selected from Mg, Mn, Fe, Co Ni, Cu, Zn, and mixtures thereof; 'x' varies from 0.5 to 1.5, or between 0.6 to 1.3 or from 0.8 to 1.2; 'y' is a number which satisfies the sum of the valences of M and Mo. The mixed metal oxide is poorly crystalline but has a unique x-ray powder diffraction pattern showing the peaks at the d-spacings listed in Table A.

TABLE A

| d(Å) |
| --- |
| 4.2-2.89 |
| 2.65-2.53 |
| 2.17-2.04 |
| 9* |

Another embodiment involves a method of making a mixed metal oxide having the formula:

$MMo_xO_y$ 

where 'M' is a metal selected from Mg, Mn, Fe, Co Ni, Cu, Zn, and mixtures thereof; 'x' varies from 0.5 to 1.5, or between 0.6 to 1.3 or from 0.8 to 1.2; 'y' is a number which satisfies the sum of the valences of M and Mo. The mixed metal oxide is poorly crystalline but has a unique x-ray powder diffraction pattern showing the peaks at the d-spacings listed in Table A:

TABLE A

| d(Å) |
|---|
| 4.2-2.89 |
| 2.65-2.53 |
| 2.17-2.04 |
| 1.53-1.45 | the method comprising: (a) forming a reaction mixture containing $NH_4OH$, $H_2O$, and sources of M and Mo; (b) adjusting the pH of the reaction mixture to a pH of from about 8.5 to about 10; (c) heating the reaction mixture to between 85° and 100° C. until the resultant pH is between 8.5 and 9.5; (d) recovering a crystalline bis-ammonia metal molybdate pre-cursor having the formula:

$$(NH_3)_{2-n}M(OH_2)_nMo_xO_y$$ 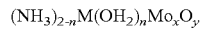

where 'M' is a metal selected from Mg, Mn, Fe, Co Ni, Cu, Zn, and mixtures thereof; 'x' varies from 0.8 to 1.2; 'y' is a number which satisfies the sum of the valences of M and Mo, the material is further characterized by a unique x-ray powder diffraction pattern showing the crystalline peaks in Table B:

TABLE B

| d(Å) | $I/I_0$ % |
|---|---|
| 7.49-7.28 | vs |
| 5.1-5.05 | s |
| 4.4-4.257 | w |
| 3.966-3.915 | m |
| 3.69-3.645 | s |
| 3.52-3.48 | m |
| 3.35-3.32 | m |
| 3.31-3.29 | m |
| 3.12-3.097 | w |
| 3-2.97 | m |
| 2.76-2.73 | m |

(e) heating the crystalline bis-ammonia metal molybdate pre-cursor at a temperature of from about 275° C. to about 350° C. for about 1 to about 24 hours; and (f) recovering the mixed metal oxide.

Yet another embodiment involves a conversion process comprising contacting a feed with a catalyst at conversion conditions to give at least one product, the catalyst comprising a mixed metal oxide having the formula:

$$MMo_xO_y$$ 

where 'M' is a metal selected from Mg, Mn, Fe, Co Ni, Cu, Zn, and mixtures thereof; 'x' varies from 0.5 to 1.5, or between 0.6 to 1.3 or from 0.8 to 1.2; 'y' is a number which satisfies the sum of the valences of M and Mo. The mixed metal oxide is poorly crystalline but has a unique x-ray powder diffraction pattern showing the peaks at the d-spacings listed in Table A:

TABLE A

| d(Å) |
|---|
| 4.2-2.89 |
| 2.65-2.53 |
| 2.17-2.04 |
| 1.53-1.45 |

Additional features and advantages of the invention will be apparent from the description of the invention, drawings and claims provided herein.

DETAILED DESCRIPTION OF THE INVENTION

The present invention relates to a mixed metal oxide, a process for preparing the mixed metal oxide composition, and processes using the mixed metal oxide as the catalyst. The composition has been given the designation UPM-5. The mixed metal oxide has an empirical formula:

$$MMo_xO_y$$ 

where 'M' is a metal selected from Mg, Mn, Fe, Co Ni, Cu, Zn, and mixtures thereof; 'x' varies from 0.5 to 1.5, or between 0.6 to 1.3 or from 0.8 to 1.2; 'y' is a number which satisfies the sum of the valences of M and Mo. The mixed metal oxide is poorly crystalline but has a unique ex-ray powder diffraction pattern showing the peaks in Table A. With the mixed metal oxide being poorly crystalline, the intensity of each peak is weak or very weak.

TABLE A

| d(Å) |
|---|
| 4.2-2.89 |
| 2.65-2.53 |
| 2.17-2.04 |
| 1.53-1.45 |

The mixed metal oxide is prepared by thermal decomposition of a crystalline bis-ammonia metal molybdate pre-cursor having an empirical formula:

$$(NH_3)_{2-n}M(OH_2)_nMo_xO_y$$ 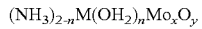

where 'M' is a metal selected from Mg, Mn, Fe, Co Ni, Cu, Zn, and mixtures thereof; 'x' varies from 0.8 to 1.2; 'y' is a number which satisfies the sum of the valences of M and Mo, the mixed metal oxide having a unique x-ray powder diffraction pattern showing the crystalline peaks in Table B.

TABLE B

| d(Å) | $I/I_0$ % |
|---|---|
| 7.49-7.28 | vs |
| 5.1-5.05 | s |

TABLE B-continued

| d(Å) | I/I₀ % |
|---|---|
| 4.4-4.257 | w |
| 3.966-3.915 | m |
| 3.69-3.645 | s |
| 3.52-3.48 | m |
| 3.35-3.32 | m |
| 3.31-3.29 | m |
| 3.12-3.097 | w |
| 3-2.97 | m |
| 2.76-2.73 | m |

Figure 2:
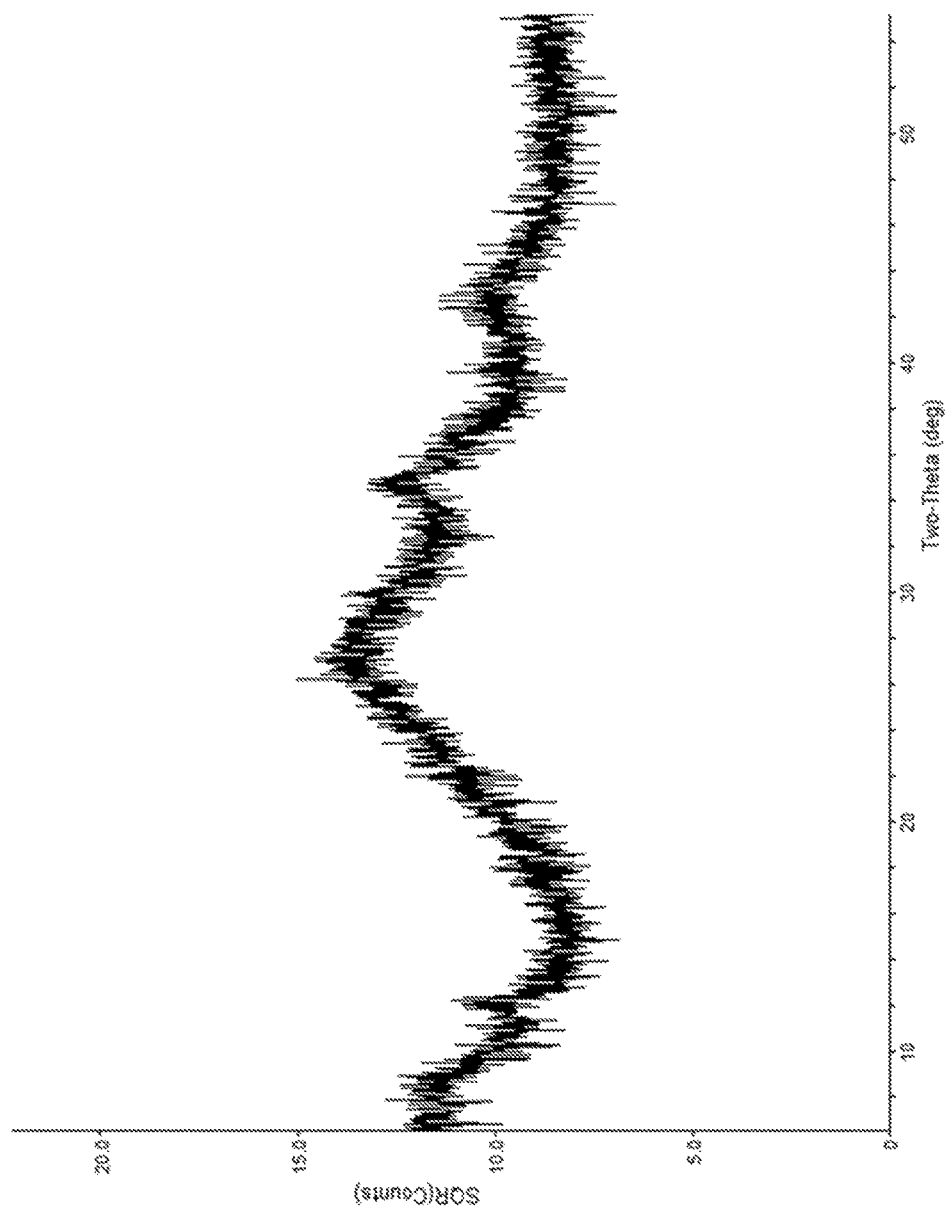
FIG. 2 is the X-ray powder diffraction pattern of the mixed metal oxide, prepared by boiling crystallization followed by thermal decomposition as described in Examples 1 to 3.

The crystalline bis-ammonia metal molybdate pre-cursor is further characterized by the x-ray powder diffraction pattern shown in FIG. 2. In one embodiment, the chemical formula of the crystalline pre-cursor is $(NH_3)_2Ni(MoO_4)$. The crystalline precursor is characterized by having an extended network of M-O-M, where M represents a metal, or combination of metals listed above. The structural units repeat itself into at least two adjacent unit cells without termination of the bonding. The composition can have a one-dimensional network, such as, for example, linear chains.

The crystalline bis-ammonia metal molybdate pre-cursor is prepared by solvothermal crystallization of a reaction mixture typically prepared by mixing reactive sources of molybdenum with the appropriate metal 'M' with a solvent as well as a source of ammonia. Specific examples of the molybdenum source which may be utilized in this invention include but are not limited to molybdenum trioxide, ammonium dimolybdate, ammonium thiomolybdate, and ammonium heptamolybdate. Sources of other metals "M" include but are not limited to the respective halide, acetate, nitrate, carbonate, thiols and hydroxide salts. Specific examples include nickel chloride, cobalt chloride, nickel bromide, cobalt bromide, magnesium chloride, zinc chloride, nickel nitrate, cobalt nitrate, iron nitrate, manganese nitrate, zinc nitrate, nickel acetate, cobalt acetate, iron acetate, nickel carbonate, cobalt carbonate, zinc hydroxide, nickel hydroxide and cobalt hydroxide.

The source of ammonia may include but is not limited to ammonium hydroxide, ammonium carbonate, ammonium bicarbonate, ammonium chloride, ammonium fluoride or a combination thereof.

Generally, the solvothermal process used to prepare the precursor of this invention involves forming a reaction mixture wherein all of the components, such as for example, Ni, Mo, NH₄OH and H₂O are mixed in solution together. By way of one specific example, a reaction mixture may be formed which in terms of molar ratios of the oxides is expressed by the formula:

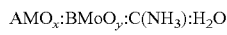

$AMO_x:BMoO_y:C(NH_3):H_2O$ where 'M' is selected from the group consisting of iron, cobalt, nickel, manganese, copper, zinc and mixtures thereof; 'A' represents the molar ratio of 'M' and may vary from 0.5 to 3, or from 0.75 and 2.0, or from 1.0 and 1.5; 'x' is a number that satisfies the valency of M; 'B' represents the molar ratio of 'Mo' and may vary from is from 0.5 to 3, or from 0.75 and 2.0, or from 1.0 and 1.5; and 'y' is a number that satisfies the valency of Mo; 'C' represents the molar ratio of $NH_3$ and may vary from is from 0.1 to 5, or from 0.5 and 3, or from 1 and 2; the molar ratio of $H_2O$ may vary from 10 to 1000, or from 20 and 500, or from 25 and 100. It is necessary to adjust the pH of the mixture the pH of the reaction mixture to a pH of from about 8.5 to about 10. The pH of the mixture can be controlled through the addition of a base such as $NH_4OH$, quaternary ammonium hydroxides, amines, and the like.

Once formed, the reaction mixture is reacted at temperatures ranging from about 90° C. to about 100° C. for a period of time ranging from 30 minutes to around 8 hours. In one embodiment the temperate range for the reaction is from about 95° C. to about 100° C. and in another embodiment the temperature range of from about 97° C. to about 100° C. In one embodiment, the reaction time is from about 4 to about 6 hours, and in another embodiment the reaction time is from about 4.5 to about 5.5 hours. Beyond 8 hours the yield suffers. The reaction is carried out under atmospheric pressure or in a sealed vessel under autogenous pressure. In one embodiment the synthesis may be conducted in an open vessel under reflux conditions. The crystalline bis-ammonia metal molybdate compositions are characterized by their unique x-ray powder diffraction pattern as shown in Table B above and in FIG. 1.

Once formed, the crystalline bis-ammonia metal molybdate pre-cursor may have a binder incorporated, where the selection of binder includes but is not limited to anionic and cationic clays such as hydrotalcites, pyroaurite-sjogrenite-hydrotalcites, montmorillonite and related clays, kaolin, sepiolites, silicas, alumina such as (pseudo) boehomite, gibbsite, calcined gibbsite, eta-alumina, zicronica, titania, alumina coated titania, silica-alumina, silica coated alumina, alumina coated silicas and mixtures thereof, or other materials generally known as particle binders in order to maintain particle integrity. These binders may be applied with or without peptization. The binder may be added to the bulk crystalline bis-ammonia metal molybdate pre-cursor, and the amount of binder may range from about 1 to about 30 wt % of the finished catalysts or from about 5 to about 26 wt % of the finished catalyst. The binder may be chemically bound to the crystalline bis-ammonia metal molybdate pre-cursor, or may be present in a physical mixture with the crystalline bis-ammonia metal molybdate pre-cursor.

The crystalline bis-ammonia metal molybdate pre-cursor, with or without an incorporated binder can then be sulfided or pre-sulfided under a variety of sulfidation conditions, these include through contact of the crystalline bis-ammonia metal molybdate pre-cursor with a sulfur containing feed as well as the use of a gaseous mixture of $H_2S/H_2$. The sulfidation of the crystalline bis-ammonia metal molybdate pre-cursor is performed at elevated temperatures, typically ranging from 50° C. to 600° C., or from 150° C. to 500° C., or from 250° C. to 450° C.

Once formed, the crystalline bis-ammonia metal molybdate pre-cursor is thermally decomposed to form the mixed metal oxide of the invention which in turn may be used as a catalyst in a variety of hydroprocessing processes. The thermal decomposition may be conducted in air, or other suitable environments, at temperatures from about 275° C. to about 350° C., or from about 290° C. to about 320° C. and for about 1 to about 24 hours; or for about 1 to about 8 hours; or from about 1 to about 4 hours. Decomposition products from these one-dimensional chains of the pre-cursor may result in one-dimensional chains or a two dimensional network i.e. layers or a three dimensional framework solid.

If the crystalline bis-ammonia metal molybdate pre-cursor did not have a binder incorporated, or was not sulfided, either may be performed after the thermal decomposition of the crystalline bis-ammonia metal molybdate pre-cursor and formation of the mixed metal oxide. If the crystalline bis-ammonia metal molybdate pre-cursor did have a binder incorporated, or was already sulfided, additional binder may be added or additional sulfiding may be conducted. The mixed metal oxide may have a binder incorporated, including but not limited to silica, alumina, silica-alumina and mixtures thereof, or other materials generally known as particle binders in order to maintain particle integrity. The binder may be added to the bulk mixed metal oxide, and the amount of binder may range from about 1 to about 30 wt % of the finished catalysts or from about 5 to about 26 wt % of the finished catalyst. The binder may be chemically bound to the mixed metal oxide decomposition product, or may be present in a physical mixture with the mixed metal oxide.

The unsupported mixed metal oxide of this invention can be used as a catalyst or catalyst support in various hydrocarbon conversion processes. Hydroprocessing processes is one class of hydrocarbon conversion processes in which the crystalline bis-ammonia metal molybdate material is useful as a catalyst. Examples of specific hydroprocessing processes are well known in the art and include hydrotreating or hydrofining, hydrogenation, hydrodearomatization, hydrodemetallation, hydrodesilication hydrocracking, hydrodenitrogenation, and hydrodesulfurization.

The operating conditions of the hydroprocessing processes listed above typically include reaction pressures from about 2.5 MPa to about 17.2 MPa, or in the range of about 5.5 to about 17.2 MPa, with reaction temperatures in the range of about 245° C. to about 440° C., or in the range of about 285° C. to about 425° C. Time with which the feed is in contact with the active catalyst, referred to as liquid hour space velocities (LHSV), should be in the range of about 0.1 $h^{-1}$ to about 10 $h^{-1}$, or from about $2.0^{-1}$ to about $8.0^{-1}$. Specific subsets of these ranges may be employed depending upon the feedstock being used. For example when hydrotreating a typical diesel feedstock, operating conditions may include from about 3.5 MPa to about 8.6 MPa, from about 315° C. to about 410° C., from about 0.25/h to about 5/h, and from about 84 Nm3 H2/m3 to about 850 Nm3 H2/m3 feed. Other feedstocks may include gasoline, naphtha, kerosene, gas oils, distillates, and reformate.

Examples are provided below so that the invention may be described more completely. These examples are only by way of illustration and should not be interpreted as a limitation of the broad scope of the invention, which is set forth in the appended claims.

Patterns presented in the following examples were obtained using standard x-ray powder diffraction techniques. The radiation source was a high-intensity, x-ray tube operated at 45 kV and 35 mA. The diffraction pattern from the copper K-alpha radiation was obtained by appropriate computer based techniques. Powder samples were pressed flat into a plate and continuously scanned from 3° and 70° (2θ). Interplanar spacings (d) in Angstrom units were obtained from the position of the diffraction peaks expressed as θ, where θ is the Bragg angle as observed from digitized data. Intensities were determined from the integrated area of diffraction peaks after subtracting background, "$I_O$" being the intensity of the strongest line or peak, and "I" being the intensity of each of the other peaks. As will be understood by those skilled in the art the determination of the parameter 2θ is subject to both human and mechanical error, which in combination can impose an uncertainty of about ±0.4° on each reported value of 2θ. This uncertainty is also translated to the reported values of the d-spacings, which are calculated from the 2θ values. In some of the x-ray patterns reported, the relative intensities of the d-spacings are indicated by the notations vs, s, m, and w, which represent very strong, strong, medium, and weak, respectively. In terms of 100(I/$I_0$), the above designations are defined as: w=0-15, m=15-60: s=60-80 and vs=80-100

In certain instances the purity of a synthesized product may be assessed with reference to its x-ray powder diffraction pattern. Thus, for example, if a sample is stated to be pure, it is intended only that the x-ray pattern of the sample is free of lines attributable to crystalline impurities, not that there are no amorphous materials present. As will be understood by those skilled in the art, it is possible for different poorly crystalline materials to yield peaks at the same position. If a material is composed of multiple poorly crystalline materials, then the peak positions observed individually for each poorly crystalline materials would be observed in the resulting summed diffraction pattern. Likewise it is possible to have some peaks appear at the same positions within different, single phase, crystalline materials, which may be simply a reflection of a similar distance within the materials and not that the materials possess the same structure.

EXAMPLE 1

Figure 1:
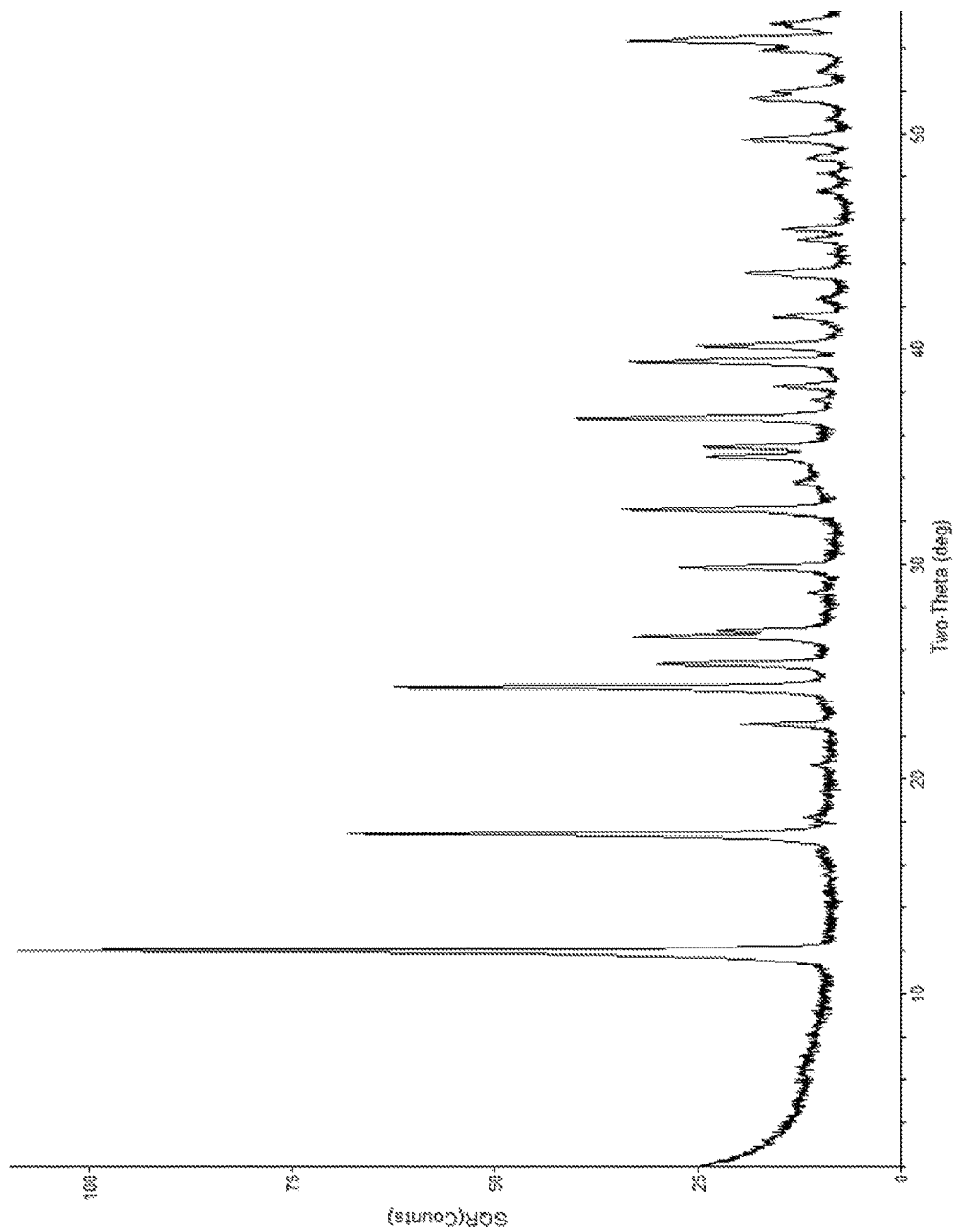
FIG. 1 is the X-ray powder diffraction pattern of the crystalline bis-ammonia metal molybdate pre-cursor prepared by boiling crystallization as described in Examples 1 to 3.

In a 3 liter flask, 35.61 g of nickel carbonate (0.3 moles Ni) and 43.17 g molybdenum trioxide (0.3 moles Mo) were added to 300 ml of water forming a slurry. To this slurry, about 90 ml of a concentrated $NH_4OH$ solution was added in order to adjust the pH to 9.1. The solution was refluxed at about 100° C. During the heating the precipitates dissolved to give a clear deep blue solution prior to the formation of a lime green precipitate. After about 5 hrs, a green precipitate was observed suspended in the blue about pH 9 solution. This precipitate was cooled to room temperature, filtered, washed with 90 ml of about 90° C. water and then dried at 100° C. The dried precipitate was analyzed by x-ray diffraction as described above, and the X-ray powder diffraction pattern is shown in FIG. 1; the phase was identified as $(NH_3)_2Ni(MoO_4)$. The bis-ammonia metal molybdate precursor, $(NH_3)_2Ni(MoO_4)$, was heated in air at a temperature of about 300° C. for about 2 hours. The resulting mixed metal oxide was analyzed by X-ray diffraction, and the X-ray powder diffraction pattern is shown in FIG. 2.

EXAMPLE 2

In a 3 liter flask, 29.67 g of nickel carbonate (0.25 moles Ni) and 2.87 g of manganese nitrate hexahydrate (0.01 moles of Mn) and 43.17 g molybdenum trioxide (0.30 moles Mo) were added to 300 ml of water forming a slurry. To this slurry, about 90 ml of a concentrated $NH_4OH$ solution was added in order to adjust the pH to 9.1. The solution was refluxed at about 100° C. During the heating the precipitates dissolved to give a clear deep blue solution prior to the formation of the lime green precipitate. After about 5 hrs, a green precipitate was observed suspended in the blue about pH 9 solution. This precipitate was cooled to room temperature, filtered, washed with 90 ml of about 90° C. water and then dried at 100° C. The dried precipitate was analyzed by x-ray diffraction as described above, and the X-ray powder diffraction pattern is shown in FIG. 1; the phase was identified as $(NH_3)_2Ni(MoO_4)$. The bis-ammonia metal molybdate precursor, $(NH_3)_2Ni(MoO_4)$, was heated in air at a temperature of about 275° C. for 2 hours. The resulting mixed metal oxide was analyzed by X-ray diffraction, and the X-ray powder diffraction pattern is shown in FIG. 2.

EXAMPLE 3

In a 1 liter flask, 10.14 g of basic nickel carbonate hydrate (0.1 moles Ni) and 17.66 g of ammonium heptamolybdate (0.1 moles Mo) were added to 200 ml of water and mixed thoroughly, after which 39.53 g ammonium bicarbonate was added and the solution was refluxed at about 100° C. During the heating the precipitates dissolved to give a clear deep blue solution prior to the formation of the lime green precipitate. After about 2 hrs, a green precipitate was observed suspended in the blue about pH 8 solution, this precipitate was cooled to room temperature, filtered, washed with 90 ml of about 90° C. water and then dried at 100° C. The dried precipitate was analyzed by x-ray diffraction as described above, and the X-ray powder diffraction pattern is shown in FIG. 1; the phase was identified as $(NH_3)_2Ni(MoO_4)$. The bis-ammonia metal molybdate precursor, $(NH_3)_2Ni(MoO_4)$, was heated in air at a temperature of 300° C. for about 2 hours. The resulting mixed metal oxide was analyzed by X-ray diffraction, and the X-ray powder diffraction pattern is shown in FIG. 2.

EMBODIMENTS

Embodiment 1 is a mixed metal oxide having the formula:

$$MMo_xO_y$$

where 'M' is a metal selected from Mg, Mn, Fe, Co Ni, Cu, Zn, and mixtures thereof; 'x' varies from 0.5 to 1.5, or between 0.6 to 1.3, or from 0.8 to 1.2; 'y' is a number which satisfies the sum of the valences of M and Mo; the mixed metal oxide having a unique x-ray powder diffraction pattern showing the peaks at the d-spacings listed in Table A:

TABLE A

| d(Å) |
| --- |
| 4.2-2.89 |
| 2.65-2.53 |
| 2.17-2.04 |
| 1.53-1.45 |

The mixed metal oxide of embodiment 1 wherein the mixed metal oxide is present in a mixture with at least one binder and wherein the mixture comprises up to 25 wt % binder.

The mixed metal oxide of embodiment 1 wherein the binder is selected from the group consisting of silicas, aluminas, and silica-aluminas.

The mixed metal oxide of embodiment 1 wherein M is nickel or cobalt.

The mixed metal oxide of embodiment 1 wherein M is nickel.

The mixed metal oxide of embodiment 1 wherein the mixed metal oxide is sulfided.

Embodiment 2 is a method of making a mixed metal oxide having the formula:

$$MMo_xO_y$$

where 'M' is a metal selected from Mg, Mn, Fe, Co Ni, Cu, Zn, and mixtures thereof; 'x' varies from 0.5 to 1.5, or between 0.6 to 1.3, or from 0.8 to 1.2; 'y' is a number which satisfies the sum of the valences of M and Mo, the mixed metal oxide having a unique x-ray powder diffraction pattern showing the peaks at the d-spacings listed in Table A:

TABLE A

| d(Å) |
| --- |
| 4.2-2.89 |
| 2.65-2.53 |
| 2.17-2.04 |
| 1.53-1.45 | the method comprising: (a) forming a reaction mixture containing $NH_4OH$, $H_2O$, and sources of M and Mo; (b) adjusting the pH of the reaction mixture to a pH of from about 8.5 to about 10; (c) heating the reaction mixture to between 85° and 100° C. until the resultant pH is between 8.5 and 9.5; (d) recovering a crystalline bis-ammonia metal molybdate pre-cursor having the formula:

$$(NH_3)_{2-n}M(OH_2)_nMo_xO_y$$

where 'M' is a metal selected from Mg, Mn, Fe, Co Ni, Cu, Zn, and mixtures thereof; 'x' varies from 0.8 to 1.2; 'y' is a number which satisfies the sum of the valences of M and Mo, the mixed metal oxide having a unique x-ray powder diffraction pattern showing the crystalline peaks in Table B:

TABLE B

| d(Å) | I/I$_0$ % |
| --- | --- |
| 7.49-7.28 | vs |
| 5.1-5.05 | s |
| 4.4-4.257 | w |
| 3.966-3.915 | m |
| 3.69-3.645 | s |
| 3.52-3.48 | m |
| 3.35-3.32 | m |
| 3.31-3.29 | m |
| 3.12-3.097 | w |
| 3-2.97 | m |
| 2.76-2.73 | m |

(e) heating the crystalline bis-ammonia metal molybdate precursor at a temperature of from about 275° C. to about 350° C. for about 1 to about 24 hours; and (f) recovering the mixed metal oxide.

The method of embodiment 2 wherein the recovering is by filtration or centrifugation.

The method of embodiment 2 further comprising adding a binder to the crystalline bis-ammonia metal molybdate precursor, or to the mixed metal oxide, or both.

The method of embodiment 2 wherein the binder is selected from the group consisting of aluminas, silicas, and alumina-silicas.

The method of embodiment 2 further comprising sulfiding the crystalline bis-ammonia metal molybdate precursor, or the mixed metal oxide, or both.

The method of embodiment 2 wherein M is nickel or cobalt.

Embodiment 3 is a conversion process comprising contacting a feed with a catalyst at conversion conditions to give at least one product, the catalyst comprising a mixed metal oxide having the formula:

$$MMo_xO_y$$

where 'M' is a metal selected from Mg, Mn, Fe, Co Ni, Cu, Zn, and mixtures thereof; 'x' varies from 0.5 to 1.5, or between 0.6 to 1.3 or from 0.8 to 1.2; 'y' is a number which satisfies the sum of the valences of M and Mo; the mixed metal having a unique x-ray powder diffraction pattern showing the peaks at the d-spacings listed in Table A:

TABLE A

| d(Å) |
|---|
| 4.2-2.89 |
| 2.65-2.53 |
| 2.17-2.04 |
| 1.53-1.45 |

The process of embodiment 3 wherein the conversion process is hydroprocessing.

The process of embodiment 3 wherein the conversion process is selected from the group consisting of hydrodenitrification, hydrodesulfurization, hydrodemetallation, hydrodearomatization, hydroisomerization, hydrodesilication, hydrotreating, hydrofining, and hydrocracking.

The process of embodiment 3 wherein the mixed metal oxide is present in a mixture with at least one binder and wherein the mixture comprises up to 25 wt % binder.

The process of embodiment 3 wherein the mixed metal oxide is sulfided.

The process of embodiment 3 wherein M is nickel or cobalt.

The invention claimed is:

1. A mixed metal oxide having the formula:

$$MMo_xO_y$$

where 'M' is a metal selected from Mg, Mn, Fe, Co Ni, Cu, Zn, and mixtures thereof; 'x' varies from 0.5 to 1.5; 'y' is a number which satisfies the sum of the valences of M and Mo; the mixed metal oxide having a unique x-ray powder diffraction pattern showing the peaks at the d-spacings listed in Table A:

TABLE A

| d(Å) |
|---|
| 4.2-2.89 |
| 2.65-2.53 |
| 2.17-2.04 |
| 1.53-1.45. |

2. The mixed metal oxide of claim 1 wherein the mixed metal oxide is present in a mixture with at least one binder and wherein the mixture comprises up to 25 wt % binder.

3. The mixed metal oxide of claim 2 wherein the binder is selected from the group consisting of silicas, aluminas, and silica-aluminas.

4. The mixed metal oxide of claim 1 wherein M is nickel or cobalt.

5. The mixed metal oxide of claim 1 wherein M is nickel.

6. The mixed metal oxide of claim 1 wherein the mixed metal oxide is sulfided.

* * * * *